US012595595B2

(12) United States Patent
Lundin et al.

(10) Patent No.: US 12,595,595 B2
(45) Date of Patent: Apr. 7, 2026

(54) PHOTOCHROMIC LIQUID CRYSTAL ELECTROSPUN COAXIAL POLYMER FIBERS

(71) Applicant: The Government of the United States of America, as represented by the Secretary of the Navy, Arlington, VA (US)

(72) Inventors: Jeffrey G. Lundin, Burke, VA (US); Matthew D. Thum, Jackson, NJ (US); Riccardo Casalini, Hyattsville, MD (US); Daniel Ratchford, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 666 days.

(21) Appl. No.: 17/475,669

(22) Filed: Sep. 15, 2021

(65) Prior Publication Data

US 2022/0081804 A1 Mar. 17, 2022

Related U.S. Application Data

(60) Provisional application No. 63/078,480, filed on Sep. 15, 2020.

(51) Int. Cl.
*D01F 1/10* (2006.01)
*C09K 19/12* (2006.01)
(Continued)

(52) U.S. Cl.
CPC ................ *D01F 1/10* (2013.01); *C09K 19/54* (2013.01); *D01D 5/003* (2013.01); *D01D 5/34* (2013.01);
(Continued)

(58) Field of Classification Search
CPC .. D01F 1/10; D01F 8/14; C09K 19/54; D01D 5/003; D01D 5/34
(Continued)

(56) References Cited

U.S. PATENT DOCUMENTS 7,303,694 B2 * 12/2007 Murphy ................. B82Y 30/00 252/299.5
2020/0248338 A1 8/2020 Lundin et al.

FOREIGN PATENT DOCUMENTS

CN 111308610 A * 6/2020 ........... C08G 75/045
KR 20070013307 A * 1/2007

OTHER PUBLICATIONS

Enz et al. "Coaxial electrospinning of liquid crystal-containing poly(vinylpyrrolidone) microfibers", Oct. 2009 (Year: 2009).*
(Continued)

*Primary Examiner* — Lynda Salvatore
(74) *Attorney, Agent, or Firm* — US Naval Research Laboratory; Joseph T. Grunkemeyer

(57) ABSTRACT

A fiber having a polymer sheath and a core. The core has a liquid crystal and a compound capable of photoisomerization, such as that shown below. A method of: providing a first solution of a polymer, providing a second solution of a liquid crystal and compound capable of photoisomerization, and electrospinning the first solution and the second solution to form the fiber.

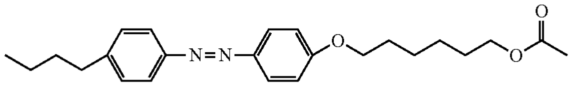

18 Claims, 20 Drawing Sheets

(51) Int. Cl.
*C09K 19/54* (2006.01)
*D01D 5/00* (2006.01)
*D01D 5/34* (2006.01)
*D01F 8/14* (2006.01)

(52) U.S. Cl.
CPC .......... *D01F 8/14* (2013.01); *C09K 2019/122* (2013.01)

(58) Field of Classification Search
USPC .......................................................... 442/373
See application file for complete search history.

(56) References Cited

OTHER PUBLICATIONS

Bertocchi et al., "Electrospun Polymer Fibers Containing a Liquid Crystal Core: Insights into Semiflexible Confinement" J. Phys. Chem. C 2018, 122, 16964-16973.
Enz et al., "Coaxial electrospinning of liquid crystal-containing poly(vinylpyrrolidone) microfibres" Beilstein Journal of Organic Chemistry 2009, 5, No. 58.
Garcia-Amorós et al., "Nematic-to-isotropic photo-induced phase transition in azobenzene-doped low-molar liquid crystals" Phys. Chem. Chem. Phys., 2009, 11, 4244-4250.
Lagerwall et al., "Coaxial electrospinning of microfibres with liquid crystal in the core" Chem. Commun., 2008, 5420-5422.
Sung et al., "Dynamics of Photochemical Phase Transition of Guest/Host Liquid Crystals with an Azobenzene Derivative as a Photoresponsive Chromophore" Chem. Mater. 2002, 14, 385-391.
Thum et al., "Photochemical phase and alignment control of a nematic liquid crystal in core-sheath nanofibers" J. Mater. Chem. C, 2021, Advance Article (Aug. 20, 2021).
Tsutsumi et al., "Photochemical Phase-Transition Behavior of Polymer Liquid Crystals Induced by Photochemical Reaction of Azobenzenes with Strong Donor-Acceptor Pairs" J. Phys. Chem. B 1998, 102, 2869-2874.
Tsutsumi et al., "Photoinduced phase transition of nematic liquid crystals with dono acceptor azobenzenes: mechanism of the thermal recovery of the nematic phase" Phys. Chem. Chem. Phys., 1999, 1, 4219-4224.
Wang et al., "Morphology Tuning of Electrospun Liquid Crystal/Polymer Fibers" ChemPhysChem 2016, 17, 3080-3085.
Yang et al., "Azobenzene based multistimuli responsive supramolecular hydrogels" J. Mater. Chem. C, 2014, 2, 9122.

* cited by examiner $C_4AzoC_6OAc$

PVP

CB5

1

2

$C_4AzoC_6OAc$

PHOTOCHROMIC LIQUID CRYSTAL ELECTROSPUN COAXIAL POLYMER FIBERS

This application claims the benefit of U.S. Provisional Application No. 63/078,480, filed on Sep. 15, 2020. The provisional application and all other publications and patent documents referred to throughout this nonprovisional application are incorporated herein by reference.

TECHNICAL FIELD

The present disclosure is generally related to fibers containing a liquid crystal core.

DESCRIPTION OF RELATED ART

Liquid crystals (LC) are an atypical state of matter that display the flow properties of liquids while still maintaining the long-range ordering and anisotropy characteristic of crystalline materials. The characteristics and properties of liquid crystals, including self-organization, birefringence, and response to external stimuli form the basis for all LC materials. Recently, coaxial electrospinning has opened up new areas of exploration with the investigation of LCs with a "core-sheath" morphology in which LCs are confined within a polymer sheath (Chien et al., "Switchable and responsive liquid crystal-functionalized microfibers produced via coaxial electrospinning" in *Emerging Liquid Crystal Technologies VII* 2012; Lagerwall et al., "Coaxial electrospinning of microfibres with liquid crystal in the core" *Chem. Commun.* 2008(42), 5420-5422; Bertocchi et al., "Electrospun Polymer Fibers Containing a Liquid Crystal Core: Insights into Semiflexible Confinement" *J. Phys. Chem. C* 2018, 122(29), 16964-16973; Kye et al., "Multifunctional responsive fibers produced by dual liquid crystal core electrospinning" *J. Mat. Chem. C* 2015, 3 (34), 8979-8985). Electrospinning is a means of generating encapsulated LCs within small, nanometer scale, cylindrical cavity or beads-on-a-string type morphology (Urbanski et al., "Liquid crystals in micron-scale droplets, shells and fibers" *J. Phys. Condens. Matter* 2017, 29(13), 133003). Fibers functionalized with LCs have been used as flexible sensors for gases, temperature, drug delivery, and electronics (Nguyen et al., "Thermochromic Fibers via Electrospinning" *Polymers* 2020, 12(4), 842; Enz et al., "Electrospun microfibres with temperature sensitive iridescence from encapsulated cholesteric liquid crystal" *J. Mat. Chem.* 2010, 20(33), 6866-6872; Reyes et al., "Non-electronic gas sensors from electrospun mats of liquid crystal core fibres for detecting volatile organic compounds at room temperature" *Liquid Crystals* 2016, 43(13-15), 1986-2001; Singh et al., "Selective Bragg reflection of visible light from coaxial electrospun fiber mats" *J. Appl. Polym.* 2020, 138:e49647). Furthermore, nanoscale confinement of LCs has been shown to amplify the effects of topological constraints, such as surface anchoring, topological defects, and surface elasticity (Urbanski et al., "Liquid crystals in micron-scale droplets, shells and fibers" *J. Phys. Condens. Matter* 2017, 29(13), 133003; Dicker et al., "Surfactant Modulated Phase Transitions of Liquid Crystals Confined in Electrospun Coaxial Fibers" *Langmuir* 2020, 36(27), 7916-7924).

One of the most powerful ways of inducing phase transition in LCs is the incorporation of dyes that can change shape upon photoisomerization (Bisoyi et al., "Light-Driven Liquid Crystalline Materials: From Photo-Induced Phase Transitions and Property Modulations to Applications" *Chem. Rev.* 2016, 116(24), 15089-15166). For this application, azobenzene-based dyes are among the most popular choice. Azobenzene is one of the most well-studied photochromic compounds. Depending on the substituents attached to the chromophore, it undergoes rapid trans-cis isomerization over a wide range of wavelengths varying from the ultraviolet (UV) to near infrared (NIR). Following its first observation in 1937, the photoisomerization has been the subject of many theoretical and experimental studies (Hartley, "The Cis-form-of Azobenzene" *Nature* 1937, 140, 281; Bandara et al., "Photoisomerization in different classes of azobenzene" *Chem. Soc. Rev.* 2012, 41(5), 1809-1825). The photoisomerization of azobenzene leads to a significant change in the molecular geometry and, in the case of liquid crystalline azobenzene materials, the molecular packing. This large geometric change has been shown to have a significant effect on all LC-related phase transitions, including the clearing point due to the nematic-isotropic transition. Triggering the phase transition of a liquid crystal photochemically using azobenzene has been studied extensively by the Ikeda group (Tsutsumi et al., "Photochemical Phase-Transition Behavior of Polymer Liquid Crystals Induced by Photochemical Reaction of Azobenzenes with Strong Donor-Acceptor Pairs" *J. Phys. Chem. B.* 1998, 102, 5, 2896-2874; Tsutsumi et al., "Photoinduced phase transition of nematic liquid crystals with donor-acceptor azobenzenes: mechanism of the thermal recovery of the nematic phase" *Phys. Chem. Chem. Phys.* 1999, 1, 5, 4219-4224, Sung et al., "Dynamics of Photochemical Phase Transition of Guest/Host Liquid Crystals with an Azobenzene Derivative as a Photoresponsive Chromophore" *Chem. Mater.* 2002, 14, 7, 385-391). It has been proposed that the decrease in the nematic-isotropic phase transition temperature ($T_{N\rightarrow I}$) is a result of a significant reduction of the order parameter, S, with the change between the trans (linear) and cis (bent) isomers. The decrease in the $T_{N\rightarrow I}$ has be used to induce the phase transition from the ordered, nematic, the to the less-ordered, isotropic, phase photochemically when a mixture of nematic LC and azobenzene derivative are irradiated at temperatures near the $T_{N\rightarrow I}$.

BRIEF SUMMARY

Disclosed herein is a fiber comprising: a sheath comprising a polymer and a core. The core comprises: a liquid crystal and a compound capable of photoisomerization.

Also disclosed herein is a method comprising: providing a first solution comprising a polymer, providing a second solution comprising a liquid crystal and compound capable of photoisomerization, and electrospinning the first solution and the second solution to form a fiber comprising: a sheath comprising the polymer and a core comprising the liquid crystal and the compound.

Also disclosed herein is a compound having the formula below.

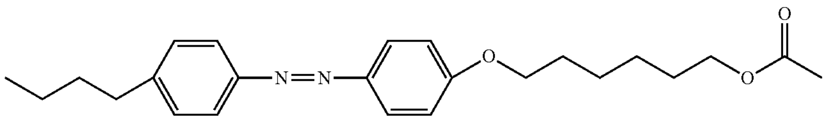 [SMILES: CCCCc1ccc(N=Nc2ccc(OCCCCCCOC(C)=O)cc2)cc1]

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed are multifunctional optical fibers with the capability to control optical character through temperature (thermotropic) and light (photochromic) stimulation. The coaxial fibers are composed of coaxial fibers with an outer polymer sheath encapsulating a blended liquid crystal solution in the core. The liquid crystal core solution can contain azobenzene derived dopants that impart additional photochromic optical behavior to the liquid crystal containing coaxial fibers. The degree to which the dopants affect the optical behavior is dependent on its concentration, as well as its chemical structure.

Previous work demonstrated that 4,4'-disubstitited azobenzenes could be used as dopants in host nematic low-molecular weight liquid crystals to photochemically induced phase transition in the liquid crystals (Garcia-Amoros et al., "Nematic-to-isotropic photo-induced phase transition in azobenzene-doped low-molar liquid crystals" *Phys. Chem. Chem. Phys.* 2009, 11(21), 4244-50). This work suggested that the difference in the non-covalent interactions between the cis (bent-shaped) and trans (rod-shaped) chromophore and the liquid crystal were the driving force behind the observation that the nematic to isotropic phase transition ($\Delta T_{N \to I}$) changed after exposure to UV light. It was observed that by extending the aromatic core of the azobenzene, the greater change in the order parameter during the trans-cis isomerization lead to a greater $\Delta T_{N \to I}$.

Figure 1:
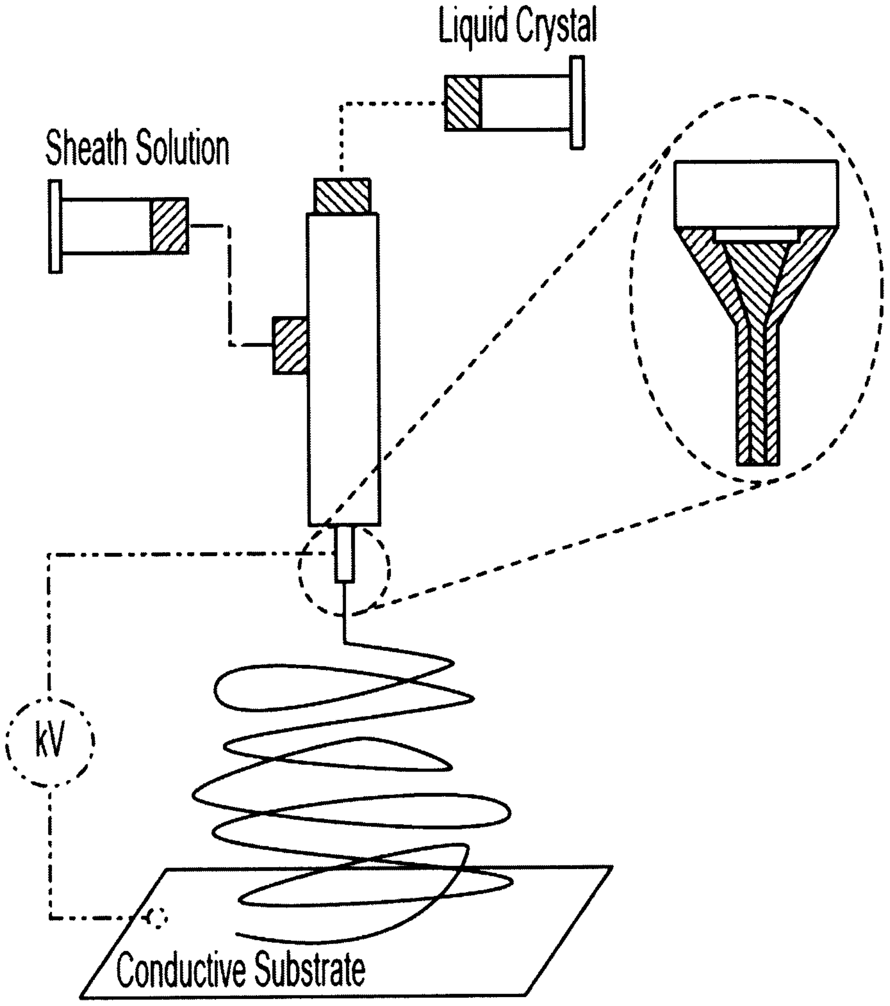
FIG. 1 schematically shows coaxial fiber fabrication.
Figure 2:
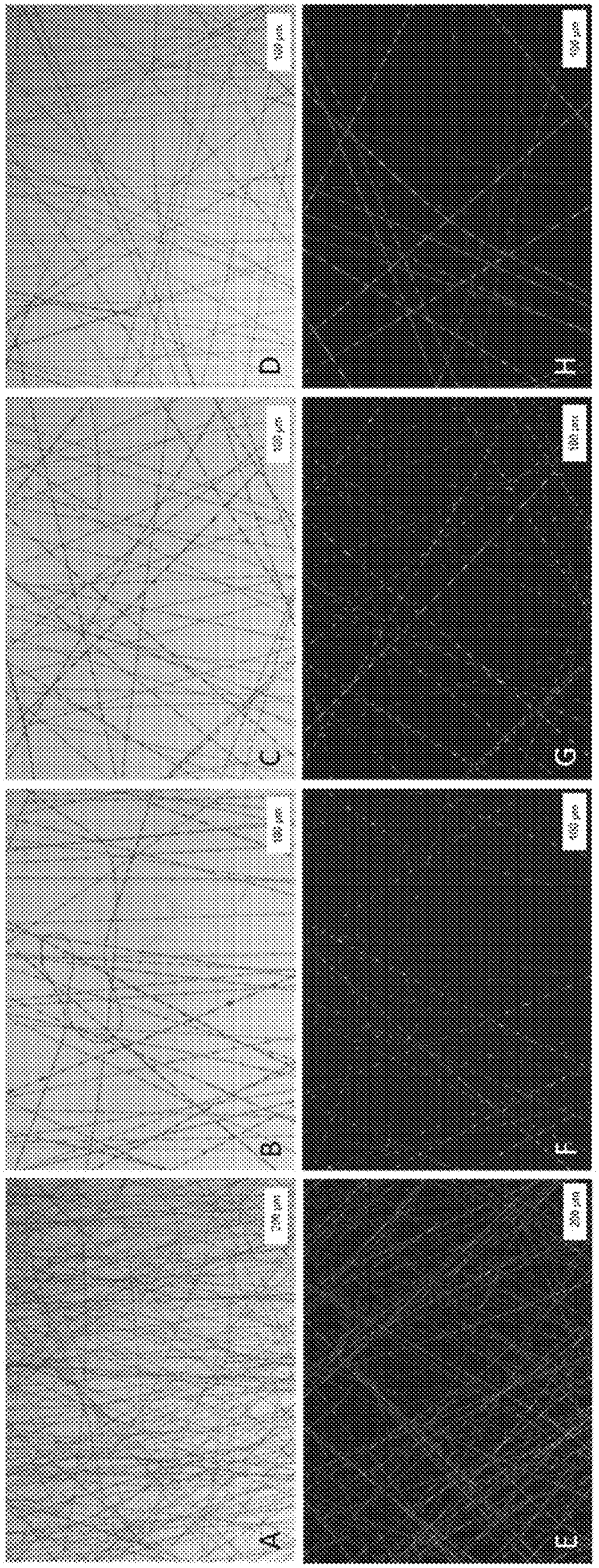
FIG. 2 shows POM images of electrospun fibers. The core solution consisted of CB5 with 0-5 wt % of $C_4AzoC_6OAc$ at a flow rate of 0.5 $mL \cdot h^{-1}$ and PVP as the sheath at a flow rate of 3.25 $mL \cdot h^{-1}$. A-D show 5, 2.5, 1 and 0 wt % of $C_4AzoC_6OAc$ in CB5 and E-H show those same images when viewed under crossed polarizers.
Figure 3:
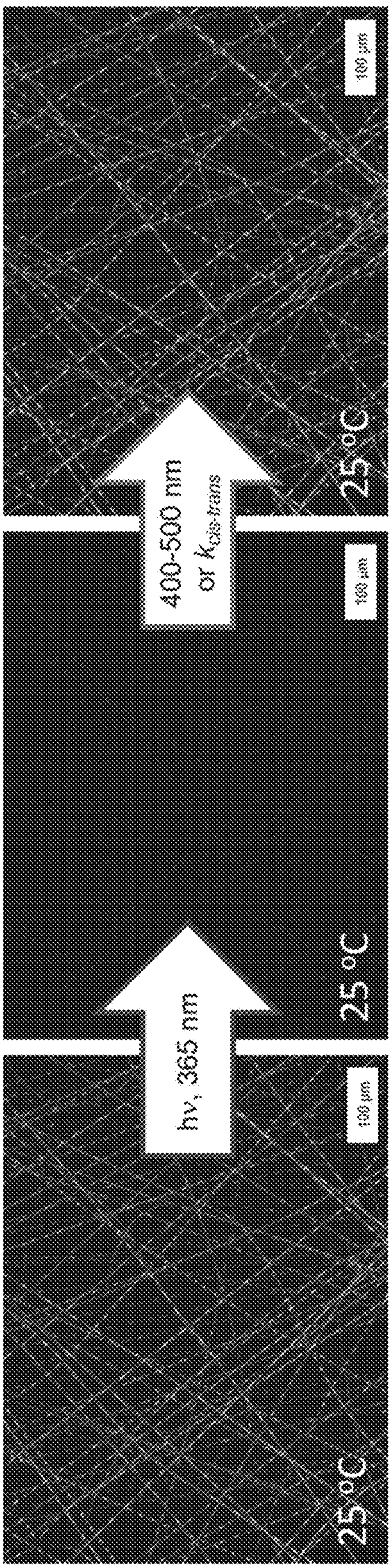
FIG. 3 shows Left: POM viewed under crossed polarizers of nanofibers with 5.0 wt % of compound $C_4AzoC_6OAc$ in CB5 as the core at 25° C. Middle: Fibers irradiated for 5 seconds with 365 nm light. Right: Fibers irradiated with 400-500 nm light for 10 seconds.
Figure 4:
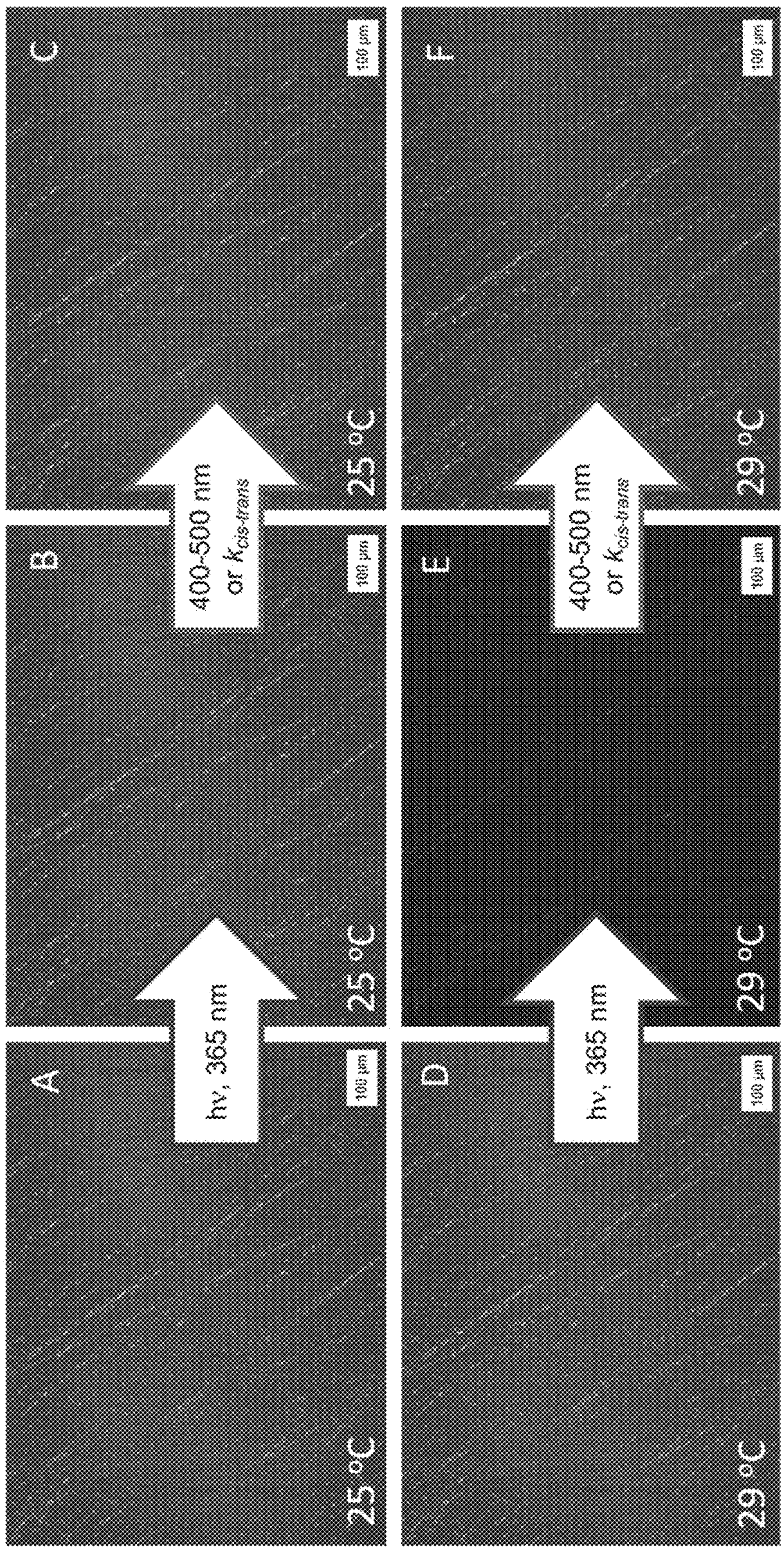
FIG. 4 shows POM viewed under crossed polarizers of nanofibers with 1.0 wt % of $C_4AzoC_6OAc$ in CB5 as the core. Middle: At 25° C. (A-C), fibers irradiated with 365 nm, or 400-500 nm show no loss of birefringence. However, the photoinduced phase transition can be seen at 33° C. (D-F).

The present fibers demonstrate control over the phase behavior of a liquid crystal (LC) encapsulated within nanofibers by light. Photochemical control over the phase transitions of CB5 encapsulated within nanoscale PVP fibers is demonstrated. An azobenzene derivate ($C_4AzoC_6OAc$, 3) was synthesized and used as the dopant to a host CB5 nematic liquid crystal. Coaxial electrospinning (FIG. 1) resulting in uniform to slightly beaded fibers which were analyzed by DSC and POM (FIG. 2). When fibers fabricated with azo-doped CB5, a slight decrease in the temperature for the endothermic peak corresponding to the nematic to isotropic phase transition was observed by DSC. The same result was overserved when the clearing point was measured by POM. After UV irradiation, however, the $T_{N \to I}$ was dramatically reduced for LC mixtures containing 5 wt. % of azo-dye, 3 with the clearing point being observed as low at 15° C. (FIG. 3). For mixtures containing less 3, the $T_{N \to I}$ was still overserved to be less than that of neat CB5, however, completely loss of birefringence required heating in addition to UV irradiation (FIG. 4). In all cases, the photoinduced phase transition was reversible, with visible, blue light, irradiation favoring the formation of the nematic state. This work demonstrates a method of modulating the phase behavior of encapsulated LCs with alternative triggers.

Figure 5:
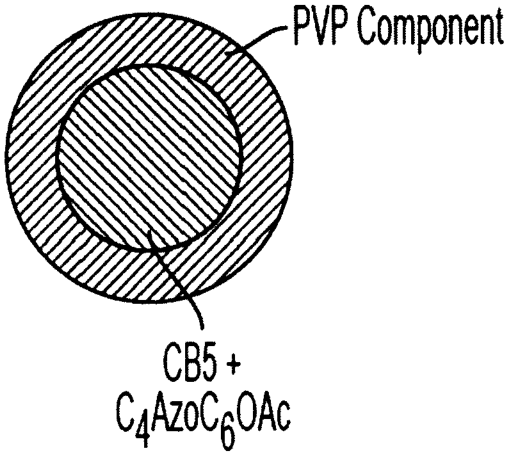
FIG. 5 shows coaxial fiber composition.
Figure 6:
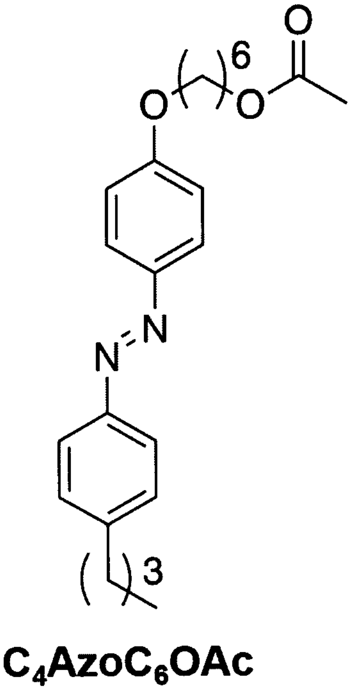
FIG. 6 shows examples of an azobenzene, a sheath polymer, and a liquid crystal.
Figure 6:
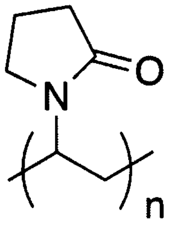
Figure 6:
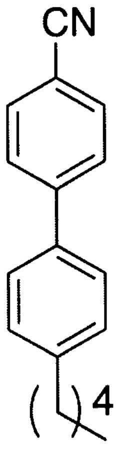

As shown in FIG. 5, the fiber has a core coaxially surrounded by a sheath. The sheath comprises a polymer such as, for example, polyvinylpyrrolidone. The core comprises two materials: a liquid crystal and a compound capable of photoisomerization. The compound is able to undergo a reversible shape change by exposure to the appropriate wavelengths of light. Such compounds are known in the art and include, but are not limited to, azobenzenes. The compound may be the azobenzene shown in FIG. 6 ($C_4AzoC_6OAc$). The liquid crystal may be, for example, 4-cyano-4'-n-pentylbiphenyl (CB5). To minimally disrupt the order parameter in the host liquid crystal (CB5), only two aromatic rings were included in the chromophore. Additionally, an alkyl chain and aliphatic ester were substituted at the 4 and 4' positions to aid in solubility as well as minimize noncovalent interactions with the liquid crystal and polymer sheath.

The fiber may be made by an electrospinning process. Methods of using electrospinning to make a core-sheath fiber are known in the art. The method uses a first solution comprising the polymer and a second solution comprising the liquid crystal and the compound capable of photoisomerization. FIG. 1 schematically shows coaxial fiber fabrication by electrospinning. The resulting fiber may have a diameter of no more than 5 microns.

The electrospinning process may form a sheet of the fibers. The sheet may be 100% of the fibers, or at least 50 wt. % of the fibers. The flat sheet may be useful as a display device. In addition to a sheet form, an article of any shape and dimension may include the fibers.

Figure 7:
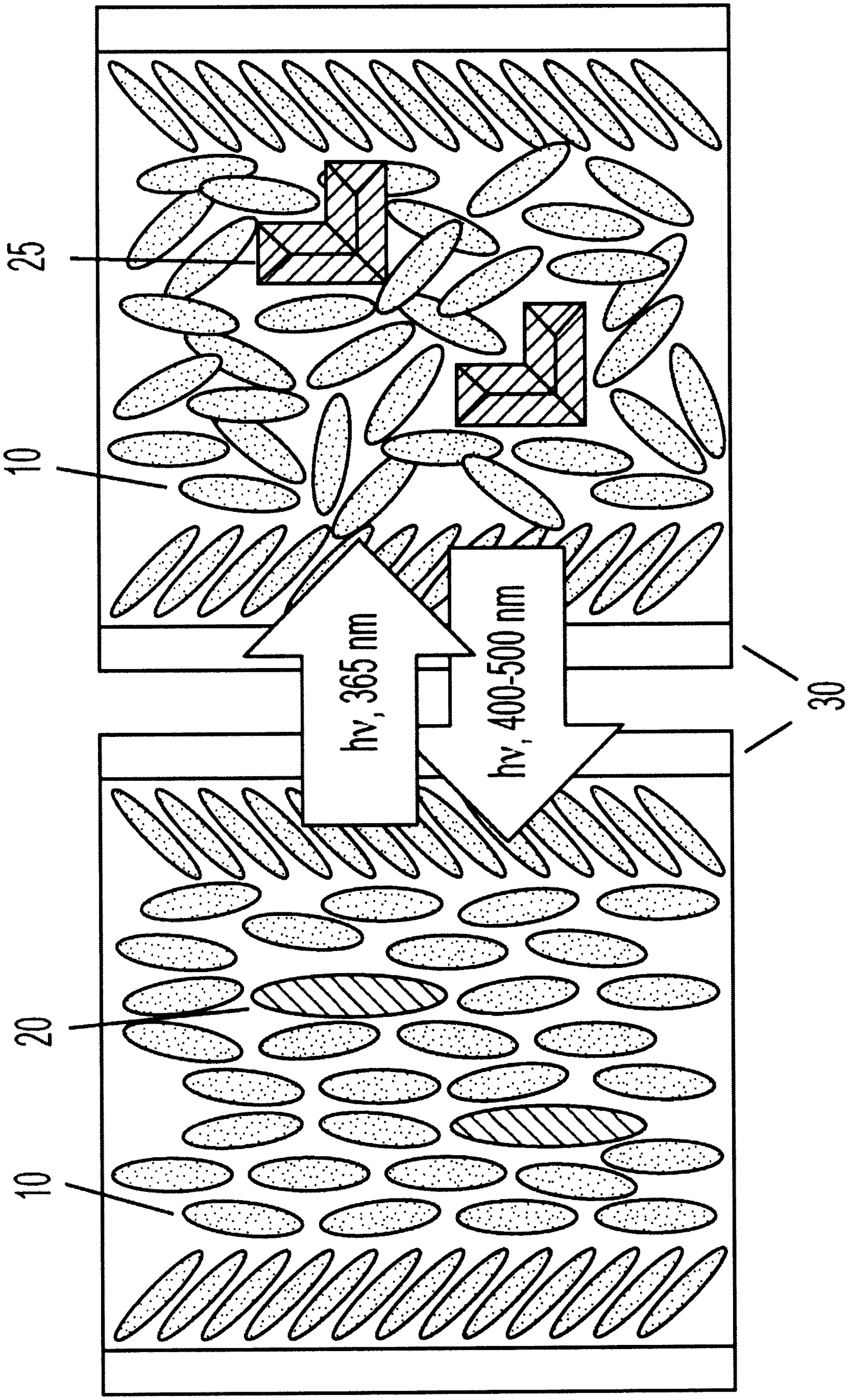
FIG. 7 schematically shows molecular orientation in the fiber.

Exposing the article to the proper wavelength of electromagnetic radiation will induce photoisomerization of the compound. For example, UV light can change an azobenzene from trans form to cis. This is schematically illustrated in FIG. 7. Liquid crystal 10 and azobenzene 20, 25 are inside the sheath 30. Initially, the azobenzene is in trans form 20 and the liquid crystal is nematic. UV light isomerizes the azobenzene to cis form 25. This disrupts the nematic phase, and the liquid. crystal 10 may become isotropic. Exposing the article a second time to the proper wavelength of electromagnetic radiation, such as visible light, will reverse the process. A temperature change may also assist in this process.

Figure 8:
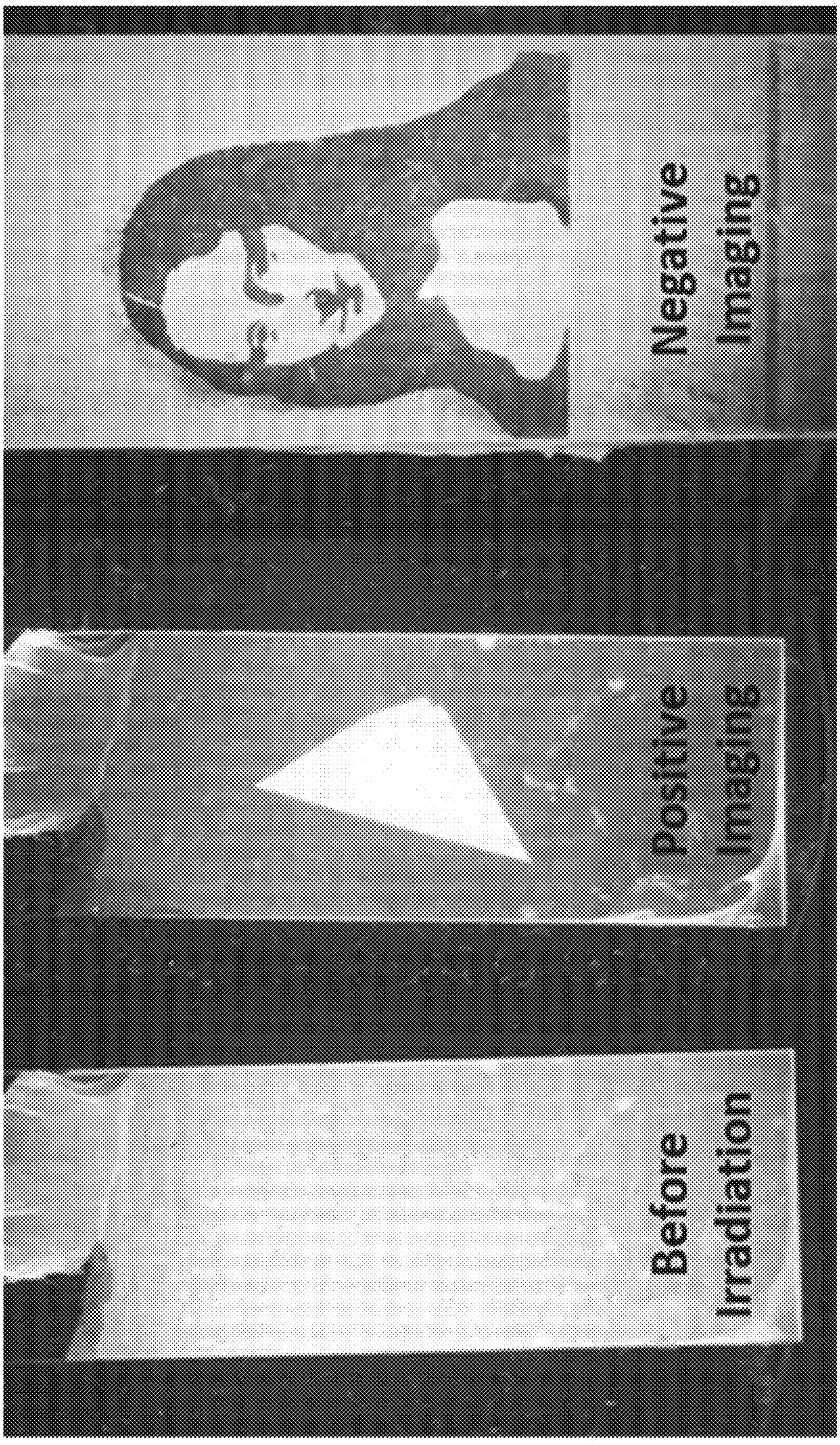
FIG. 8 shows photographs of a mat imaged fibers.

When only a portion of the article is exposed to UV light, an image of the exposed portion is retained on the surface of the article. The image may be visible under cross-polarized light. The image is erased by the visible light. This process may be repeated. FIG. 8 shows photographs of a mat of the fibers imaged by this process.

The following examples are given to illustrate specific applications. These specific examples are not intended to limit the scope of the disclosure in this application.

EXAMPLES

Materials—Unless otherwise noted, all chemical properties were provided by Sigma Aldrich. Polyvinylpyrrolidone (PVP) ($M_w$ 1,300,000 g/mol) was obtained from Acros Organics, 4-cyano-4'-n-pentylbiphenyl (CB5) was obtained from TCI America, ethanol was obtained from The Warner-Graham Company, and sodium chloride was obtained from Fisher Scientific. All materials were used as received.

Solution Preparation—PVP was dissolved in ethanol with 0.5% NaCl at 12.5 wt. %. The LC CB5 was used and doped with 0-5 wt. % of azobenzene derivative. The addition of NaCl aimed to increase the electrical conductivity of the solution to promote the formation of thinner fibers.

Figure 9:
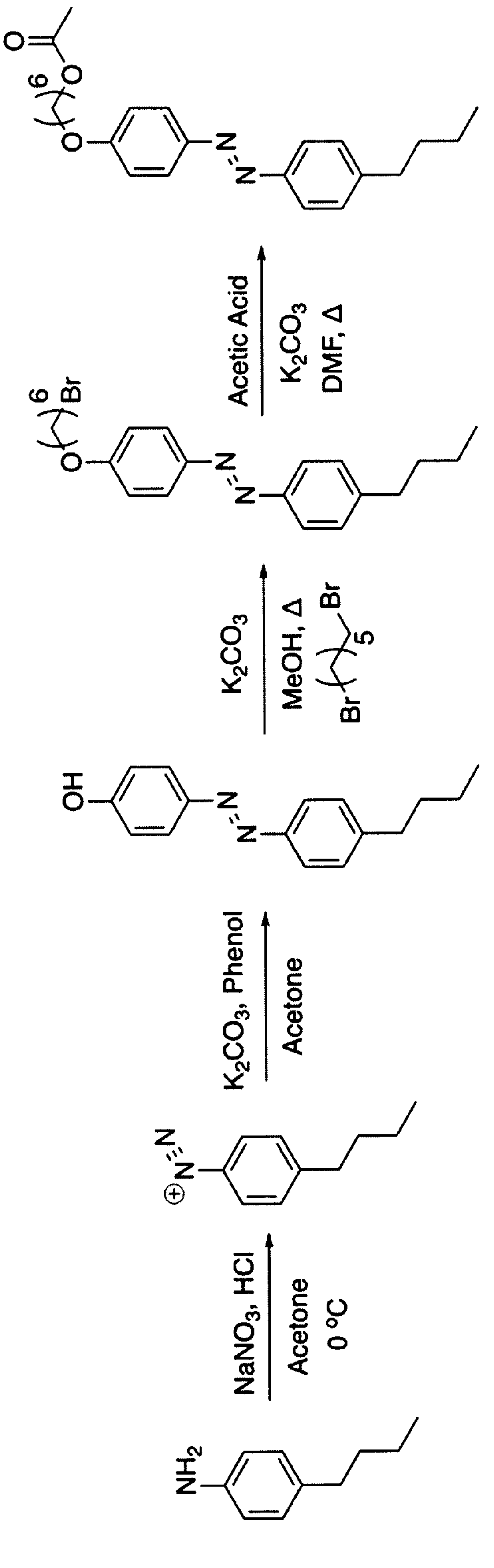
FIG. 9 shows the synthesis of $C_4AzoC_6OAc$.

Synthesis of $C_4AzoC_6OAc$ (FIG. 9)—Phenol, 4-[2-(4-butylphenyl)diazenyl]-($C_4AzoOH$, 1) was synthesized according to *Langmuir,* 2003, 19, 10764-10773 with minor adjustments. To make the diazonium salt, at 0° C. using an ice bath, butylaniline, (6.0 g, 40.2 mmol) was added to a 250 mL round bottom flask with 50 mL each of acetone and deionized (DI) water. To this, 8 mL of concentrated HCl was added. After 20 minutes, a solution of 3.4 g $NaNO_2$ in 50 mL DI water was added dropwise over the course of 30 minutes. After all of the $NaNO_2$ solution has been added, the solution was stirred at 0° C. for 2 hours. In a separate 500 mL round bottom flask, phenol (3.8 g, 40.4 mmol), NaOH (1.6 g, 1 eq), and $K_2CO_3$ (5.6 g, 1 eq) were dissolved in 100 mL of DI water. After stirring for 30 min to completely dissolve everything, the solution was cooled to 0° C. on an ice bath. The diazonium solution was added dropwise to the phenol solution at 0° C. over the course of 1 hour. After stirring for 2 hours, the solution was filtered and the precipitate was recrystallized from hexanes/chloroform to yield 6.7 g of 1 as yellow crystals in 66% yield. $^1H$ NMR (400 MHz, $(CD_3)_2SO$) δ, ppm: 7.73 (dd, 4H), 7.34 (d, 2H), 6.93 (d, 2H), 2.65 (t, 2H), 1.59 (m, 2H), 1.33 (m, 2H), 0.91 (t, 3H).

Diazene, 1-[4-[(6-bromohexyl)oxy]phenyl]-2-(4-butylphenyl)-($C_4AzoC_6Br$, 2): In a 500 mL RBF, $C_4AzoOH$, 1, 10.9 g (44 mmol), was dissolved in 250 mL of acetone. After the dissolution of 1, $K_2CO_3$, 10.8 g (80 mmol) was added. To this solution, 24.2 g (100 mmol) of 1,6-dibromohexane was added. The solution was refluxed for 18 hours and filtered hot. The filtrate was added to 500 mL of cold methanol and put in the freezer at 5° C. for one hour. 2 formed as an orange precipitate. The orange solid was filtered and was repeated two more times or until no noticeable precipitate formed. The orange powder was dried at room temperature overnight to yield 15.3 g of 2 as an orange powder in 71% yield. $^1H$ NMR (400 MHz, $CDCl_3$) δ, ppm: 7.91 (d, 2H), 7.82 (d, 2H), 7.30 (d, 2H), 7.01 (d, 2H), 4.04 (t, 2H), 3.44 (t, 2H), 2.69 (t, 2H), 1.86 (m, 4H), 1.65 (m, 2H), 1.55 (m, 4H), 1.41 (m, 2H), 0.96 (t, 3H).

Figure 10:
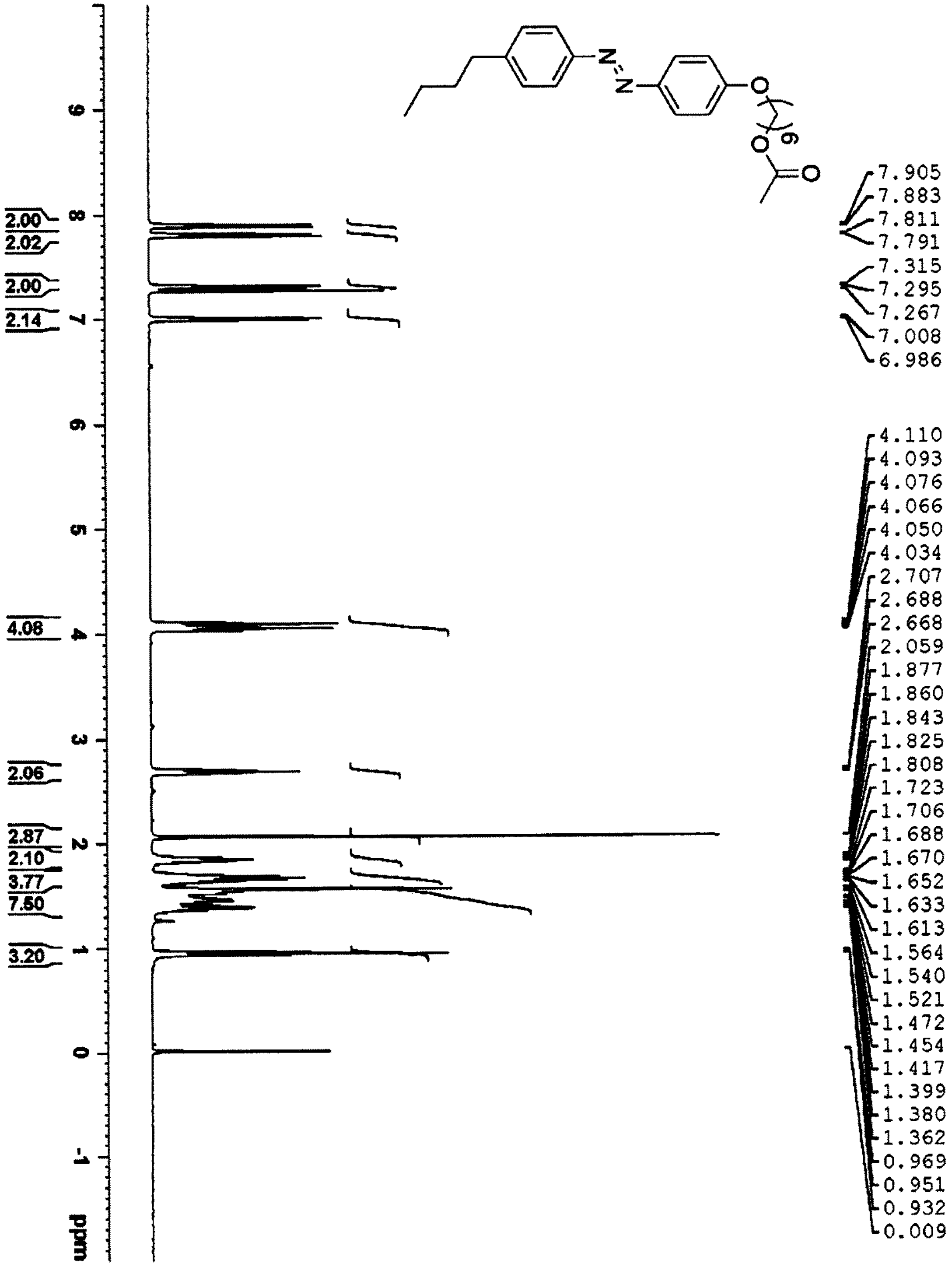
FIG. 10 shows $^1H$ NMR of $C_4AzoC_6OAc$.
Figure 11:
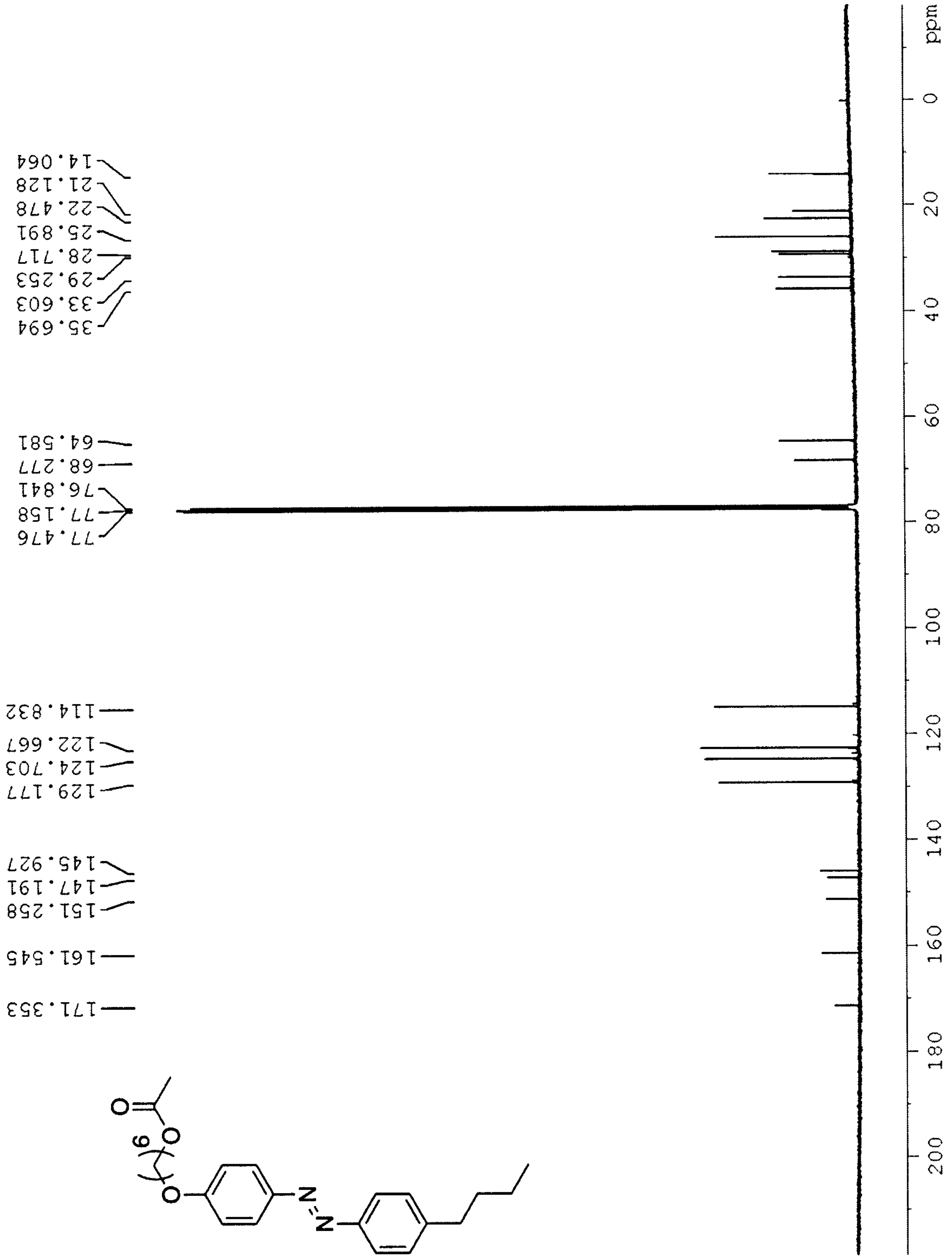
FIG. 11 shows $^{13}C$ NMR of $C_4AzoC_6OAc$.

$C_4AzoC_6OAc$: In a 250 mL round bottom flask equipped with a reflux condenser, 1.62 g of 2 (3.9 mmol), 2.96 g $K_2CO_3$ (21.45 mmol) and 1.3 mL acetic acid (20.6 mmol) in 100 mL of dimethyl formamide. The solution was heated to 80° C. for 72 hours before being hot filtered. The solution was concentrated under reduced pressure and poured into 100 mL of cold methanol. The solution was cooled to 5° C. for 1 hour before 3 was filtered off as a bright orange powder. The process was repeated 2 additional times or until no noticeable precipitate formed. The bright orange powder was dried at room temperature overnight to yield 1.48 g of 3 as an orange powder in 96% yield. $^1H$ NMR (400 MHz, $CDCl_3$, FIG. 10) δ, ppm: 7.90 (d, 2H), 7.8 (d, 2H), 7.31 (d, 2H), 7.00 (d, 2H), 4.09 (m, 4H), 2.67 (t, 2H), 2.09 (s, 3H), 1.84 (m, 2H), 1.67 (m, 4H), 1.56-1.36 (m, 8H), 0.95 (t, 3H); $^{13}C$ NMR (400 MHz, $CDCl_3$, FIG. 11) 171.4, 161.5, 151.3, 147.2, 145.9, 129.2, 124.7, 122.7, 114.8. 68.3, 64.6, 35.7, 33.6, 29.3, 28.7, 25.9, 22.5, 21.1, 14.1; m/z calcd for (M+) 397.2491, found 397.2401.

Figure 12:
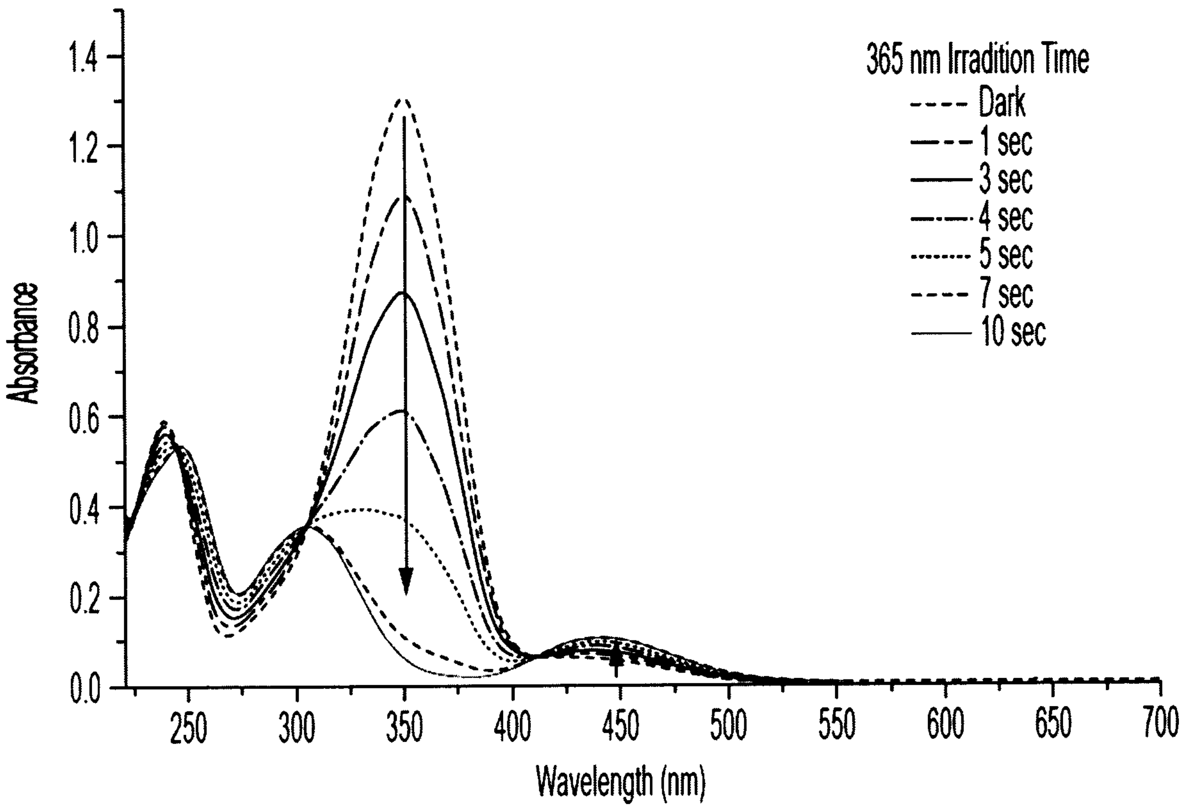
FIG. 12 shows UV/Vis absorbance spectrum of $C_4AzoC_6OAc$ in acetonitrile under UV, 365 nm, irradiation.
Figure 13:
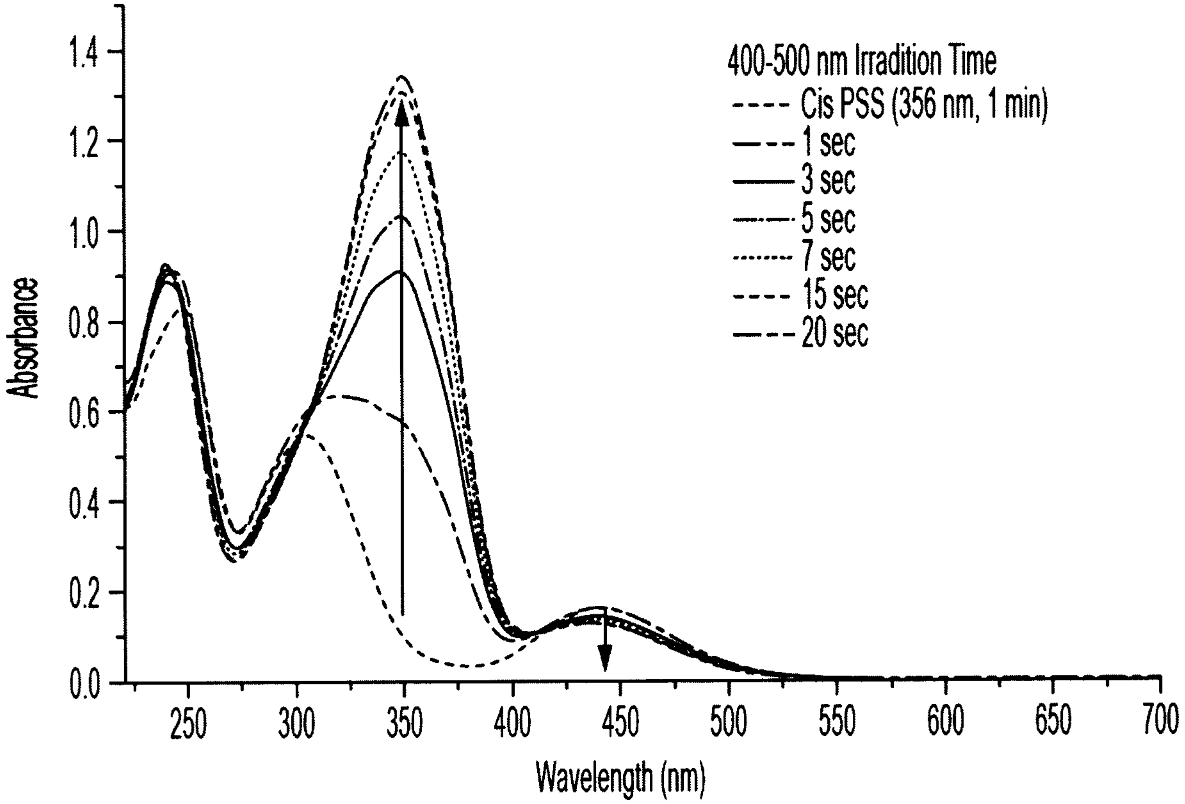
FIG. 13 shows visible light, 400-500 nm, photolysis of the cis PSS from 1 min of UV irradiation.
Figure 14:
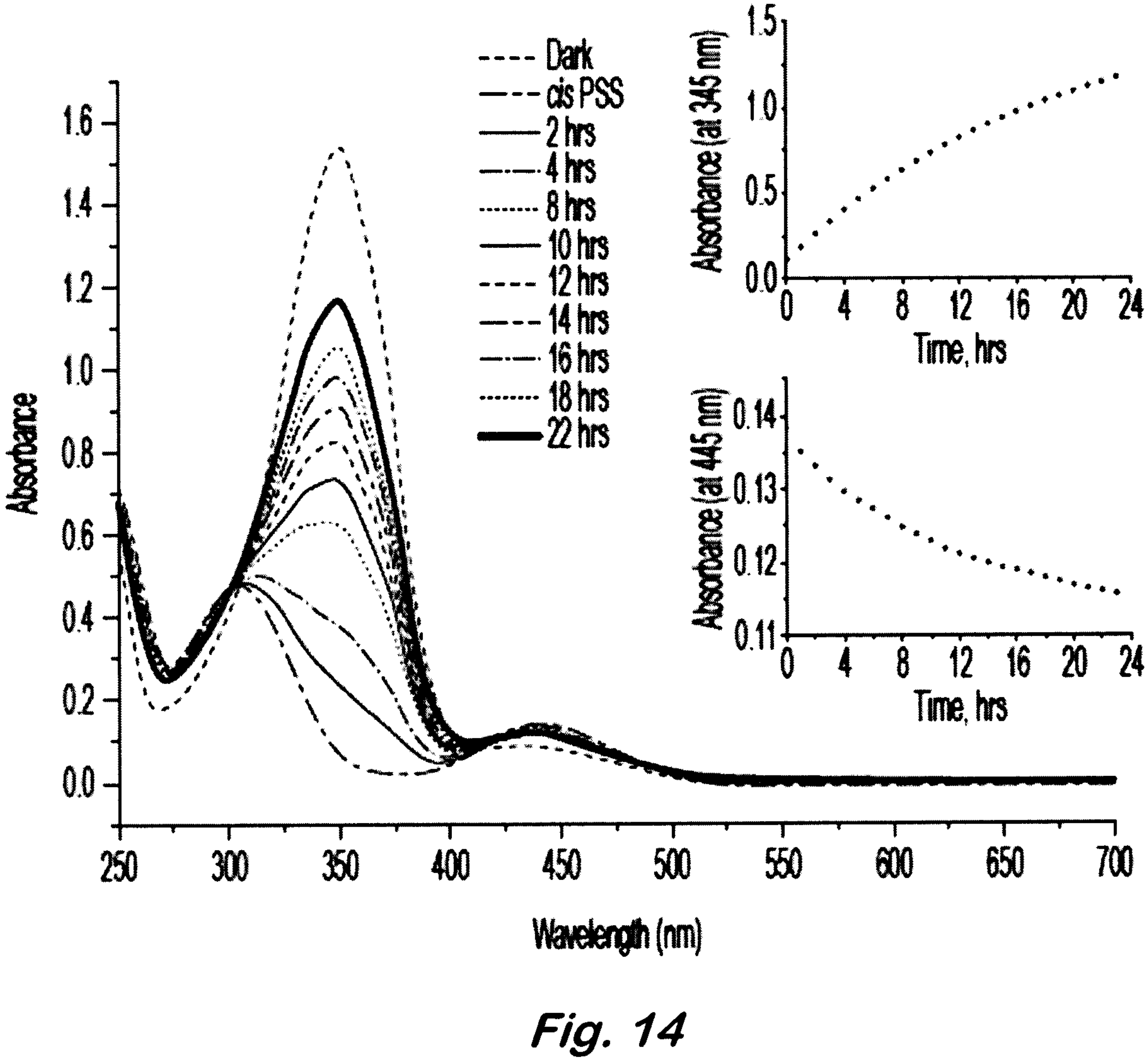
FIG. 14 shows UV-vis absorbance spectra.
Figure 15:
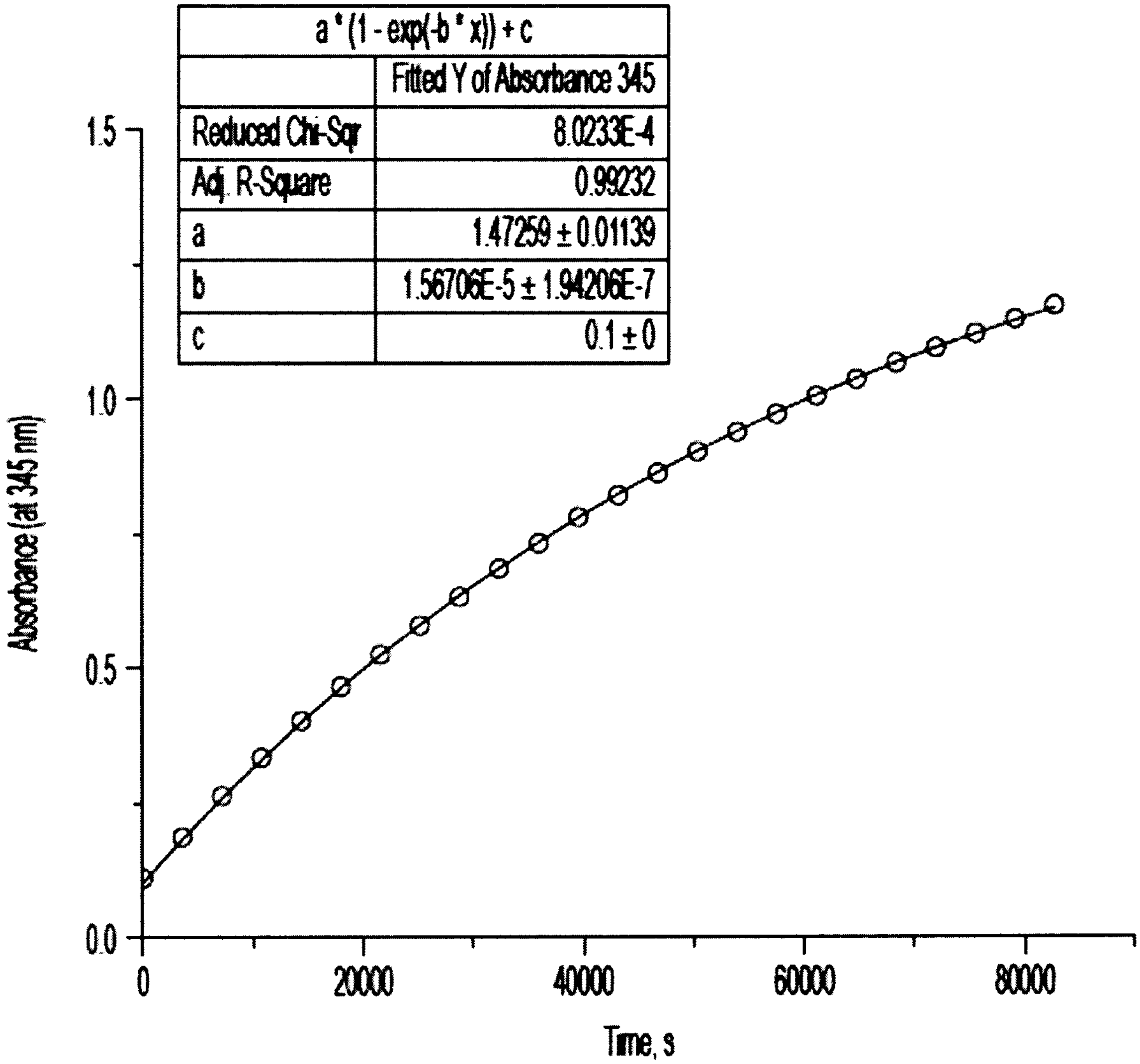
FIG. 15 shows the exponential fit of absorbance at 345 nm vs. time and calculated half-life.

The absorbance spectra of $C_4AzoC_6OAc$ in acetonitrile are shown in FIGS. 12-13. In its trans isomer, it absorbs strongly in the UV, with a peak at 348 nm. Irradiation at 365 nm triggers the photoisomerization with a corresponding decrease in the peak at 348 nm and the formation of two new peaks at 305 and 445 nm. Photoisomerization of $C_4AzoC_6OAc$ was rapid, with the solution reaching its photostationary state after less than 1 minute of irradiation. Photolysis of the cis isomer with 400-500 nm visible light causes the recovery of the peak at 348 nm and a subsequent disappearance of the peaks at 305 and 445 nm demonstrating the photochromic nature of the isomerization. It is worth noting that the photostationary state (PSS) after 400-500 nm irradiation never completely recovers to the initial ratio of isomers, even after prolonged irradiation (FIG. 14). In acetonitrile at room temperature, the trans isomer of $C_4AzoC_6OAc$ has a half-life ($t_{1/2}$) 12.3 hours. The trans-cis isomerization ($k_{cis-trans}$) was calculated by measuring the recovery of the peak at 345 nm corresponding to trans isomer after irradiation with UV light and fitting the data to a first order model (FIG. 15).

Electrospinning—Coaxial electrospinning was performed on a custom-built apparatus utilizing two New Era Syringe Pumps (NE-500 OEM) controlled by Syringe Pump Pro software. The syringe pumps were equipped with a 1 mL syringe containing the neat CB5 fixed with a coaxial needle (Ramé Hart, inner Gauge 22/outer Gauge 12) and the other with a 24 mL syringe containing the sheath solution connected to the outlet of the coaxial needle through TYGON® tubing. The needle was set a distance of 10 cm away from the collector vertically. The voltage between the needle and collector was set at 10 kV by a Matsusada high voltage power supply. The syringe pump flow rate was 0.5 $mL \cdot h^{-1}$ for the core and was held constant at 3.25 $mL \cdot h^{-1}$ for the sheath solution. Fibers were collected onto aluminum foil, glass slide, or silicon wafer. Fibers were analyzed within 24 hours of spinning.

Core-sheath nanofibers were fabricated through electrospinning using a coaxial needle setup. The sheath solution was made up of PVP in ethanol with NaCl which was pumped through a large, 12 gauge outer needle at 3.25 $mL \cdot h^{-1}$. PVP was chosen as the sheath solution because of its low birefringence leading to nearly transparent sheaths. The core was composed of CB5 doped with 0-5.0 wt. % of $C_4AzoC_6OAc$ which was pumped through a small, 22 gauge needle with a flow rate of 0.5 $mL \cdot h^{-1}$. At room temperature, CB5 is a viscous liquid with a nematic to isotropic transition at 35° C. The fibers were electrospun onto aluminum, or glass slides at a distance of 10 cm and a voltage of 10 kV. The inner and outer flow rates were optimized to obtain uniform coaxial fibers that ranged in morphology from uniform to beaded fibers. The fibers were analyzed within 24 hours of fabrication.

Polarized Optical Microscopy (POM)—Polarized optical microscopy was performed using a Zeiss Axio Imager 2 equipped with cross-polarizers. Images were taken using EC Epiplan-Neofluar 5-100× objectives and processed using Zen Core software (Zeiss, Oberkochen, Germany). Samples were prepared on glass slides and were analyzed in reflection or transmission mode, respectively, under both polarized and 90° cross-polarized light. The microscope was also equipped with a custom-built thermal stage, with which the temperature was controlled from room temperature to 40° C. at a rate of 5° $C \cdot min^{-1}$ to observe phase transitions. Fiber dimensions were measured from POM images using Image J software (n≥100).

Fibers generated were inhomogeneous when viewed under crossed polarizers due to the beading of the LC within the PVP sheath. All fibers formed with the inclusion of $C_4AzoC_6OAc$ were quasi-continuous with slight beading (FIGS. 2, A-B and E-F). There was no significant change in fiber morphology with the modulation of the concentration of the photochromic dopant. Fiber diameter was measured using Image J software as an average of 100 randomly selected measurements. Fibers manufactured with CB5 doped with $C_4AzoC_6OAc$ had diameters of 1.6±0.5, 1.4±0.5, and 1.8±0.7 μm for 5, 2.5, and 1 wt. % respectively. This was similar to fibers with a neat CB5 core (1.8±0.5 μm). Neither the presence of $C_4AzoC_6OAc$, nor the concentration had any significant effect on the fiber diameter, or morphology.

Figure 16:
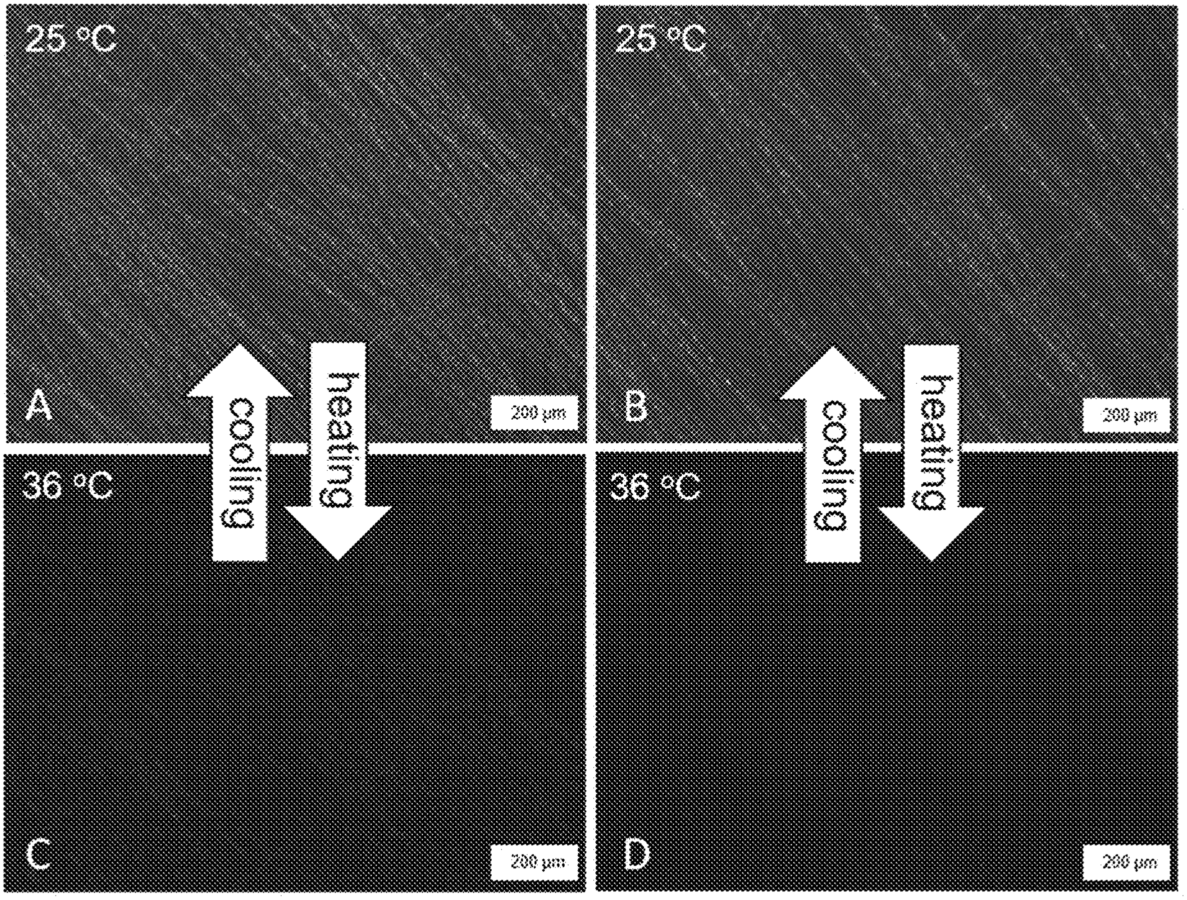
FIG. 16 shows N-I loss of birefringence observed in coaxial electrospun mat using POM. Fibers shown contain 5 wt % (A, C) and 0 wt % (B, D) of $C_4AzoC_6OAc$. Scale bar=50 μm (A, B, C) and 100 μm (D).
Figure 17:
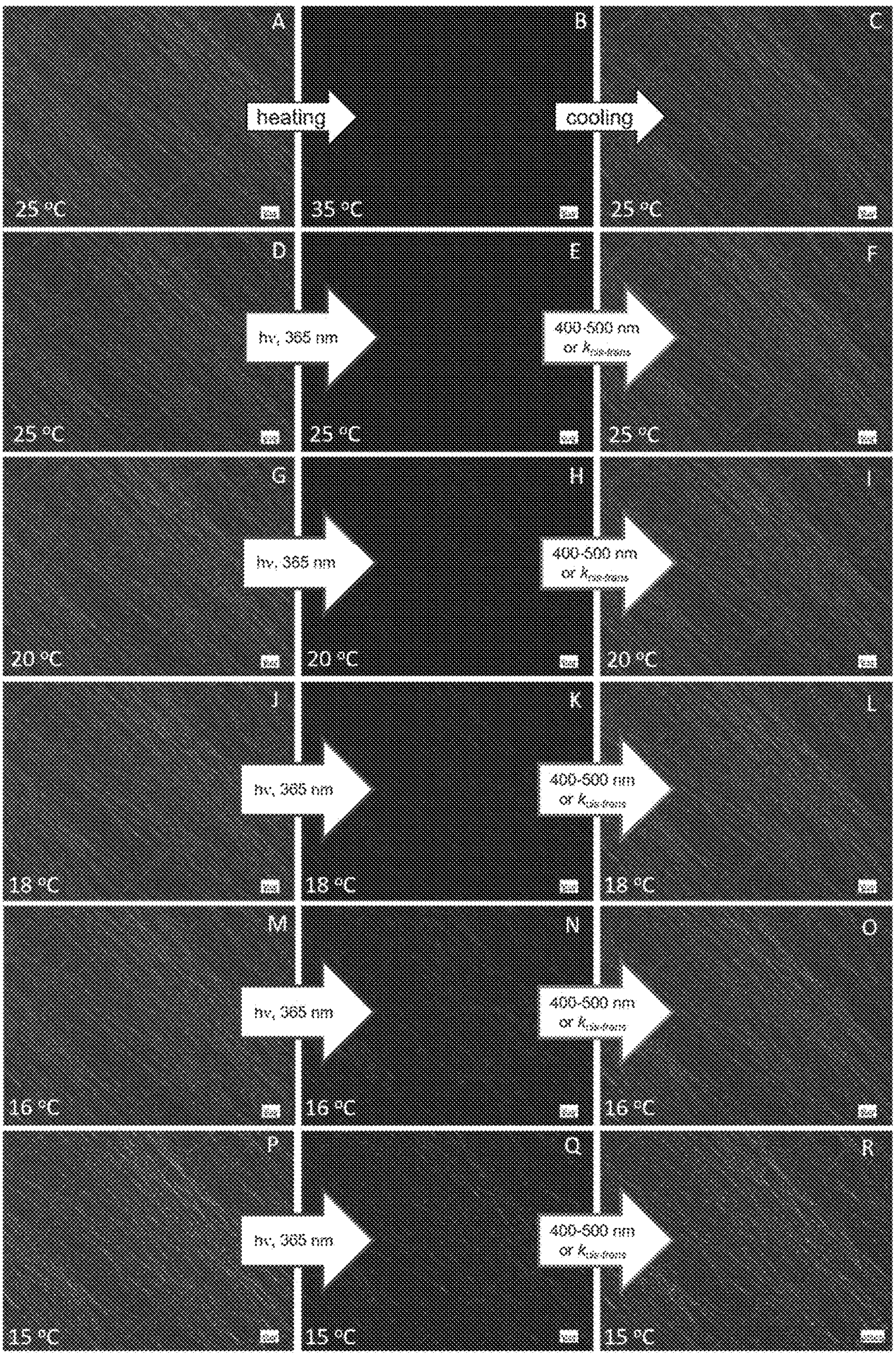
FIG. 17 shows cross-polarized POM of PVP CB5 fibers with 5.0 wt % $C_4AzoC_6OAc$ at various temperatures. Arrows show first irradiation with 365 nm, then second irradiation with 400-500 nm to reverse the process.
Figure 18:
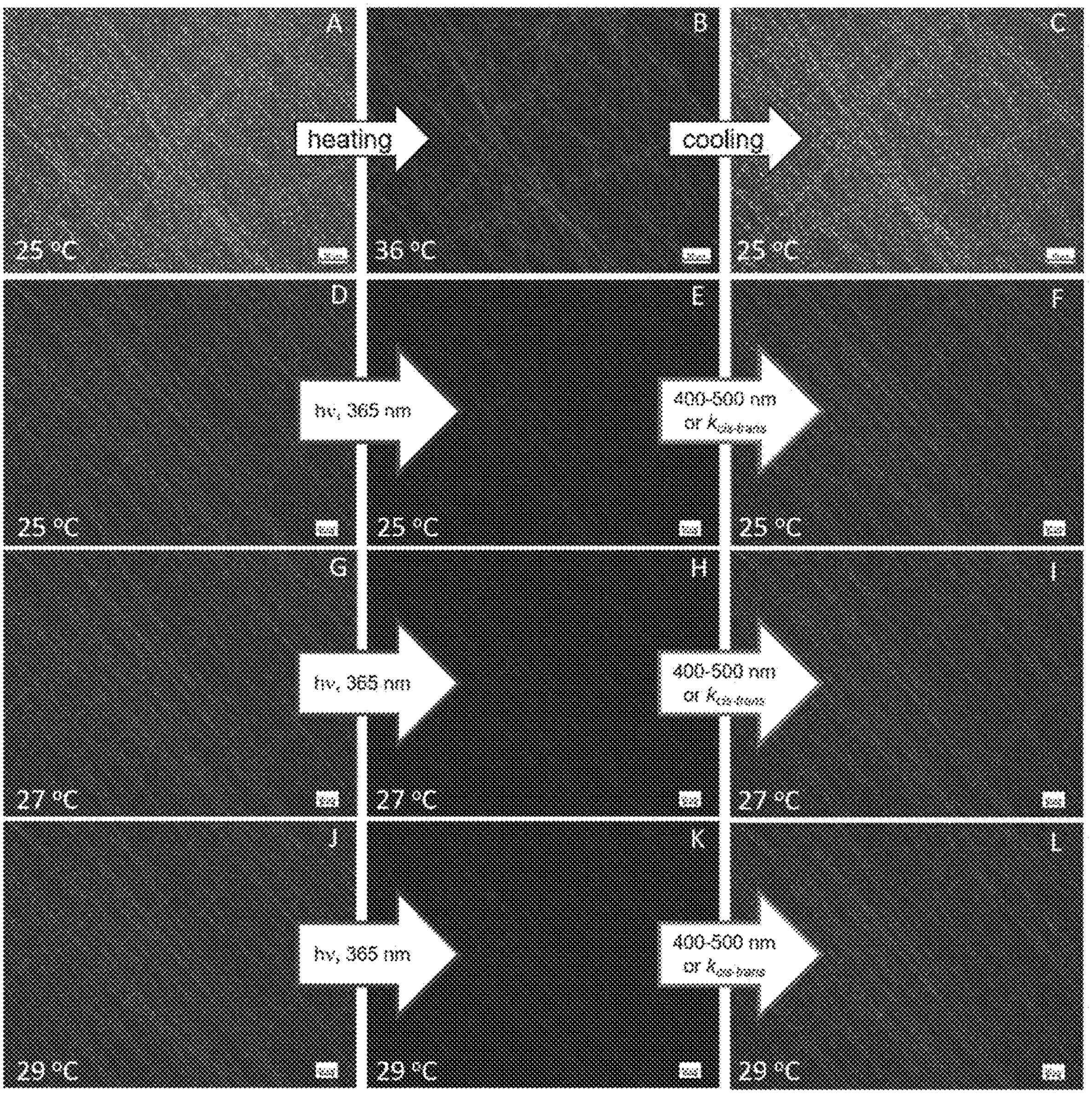
FIG. 18 shows cross-polarized POM of PVP CB5 fibers with 2.5 wt % $C_4AzoC_6OAc$ at various temperatures. Arrows show first irradiation with 365 nm, then second irradiation with 400-500 nm to reverse the process.
Figure 19:
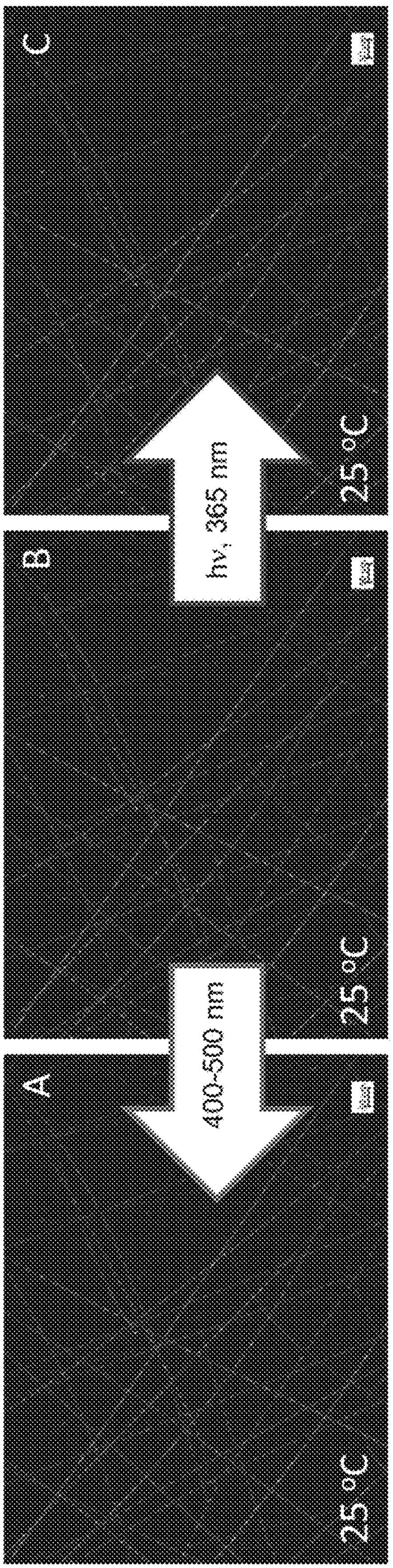
FIG. 19 shows cross-polarized POM of PVP CB5 fibers with 0.0 wt % $C_4AzoC_6OAc$ at 25° C. Arrows show first irradiation with 365 nm, then second irradiation with 400-500 nm.

The nematic to isotropic transition in fibrous mats was directly observed using POM (FIG. 16). The birefringence of the nematic phase of the fibrous mats was lost upon heating above the $T_{N \rightarrow I}$. The phase transition was reversible upon cooling below the $T_{N \rightarrow I}$. Incorporation of $C_4AzoC_6OAc$ into the LC core did not significantly affect the $T_{N \rightarrow I}$ of the fibers. Both the clearing of the nematic phase as well as its reversibility demonstrate that the LC is encapsulated within the PVP sheath and the neither the encapsulation, nor the azobenzene dopant significantly hinder the phase behavior of CB5. FIGS. 17 and 18 show additional images for fibers having 5.0 and 2.5 wt. % $C_4AzoC_6OAc$ at various temperatures. FIG. 19 shows that there was no effect with 0 wt. % $C_4AzoC_6OAc$.

Differential Scanning calorimetry (DSC)—TA Instruments Discovery DSC (New Castle, Del.) was employed to investigate the phase transitions of the core-sheath fibers. Samples were cut from the electrospun mat and placed into Tzero Pans (TA Instruments). The DSC equilibrated at 25° C. before a temperature ramp to 60° C. at a rate of 5° $C \cdot min^{-1}$. The sample was then cooled at a rate of 5° $C \cdot min^{-1}$ to 10° C. This process was repeated three times. Results were analyzed using TA Instruments TRIOS software.

Figure 20:
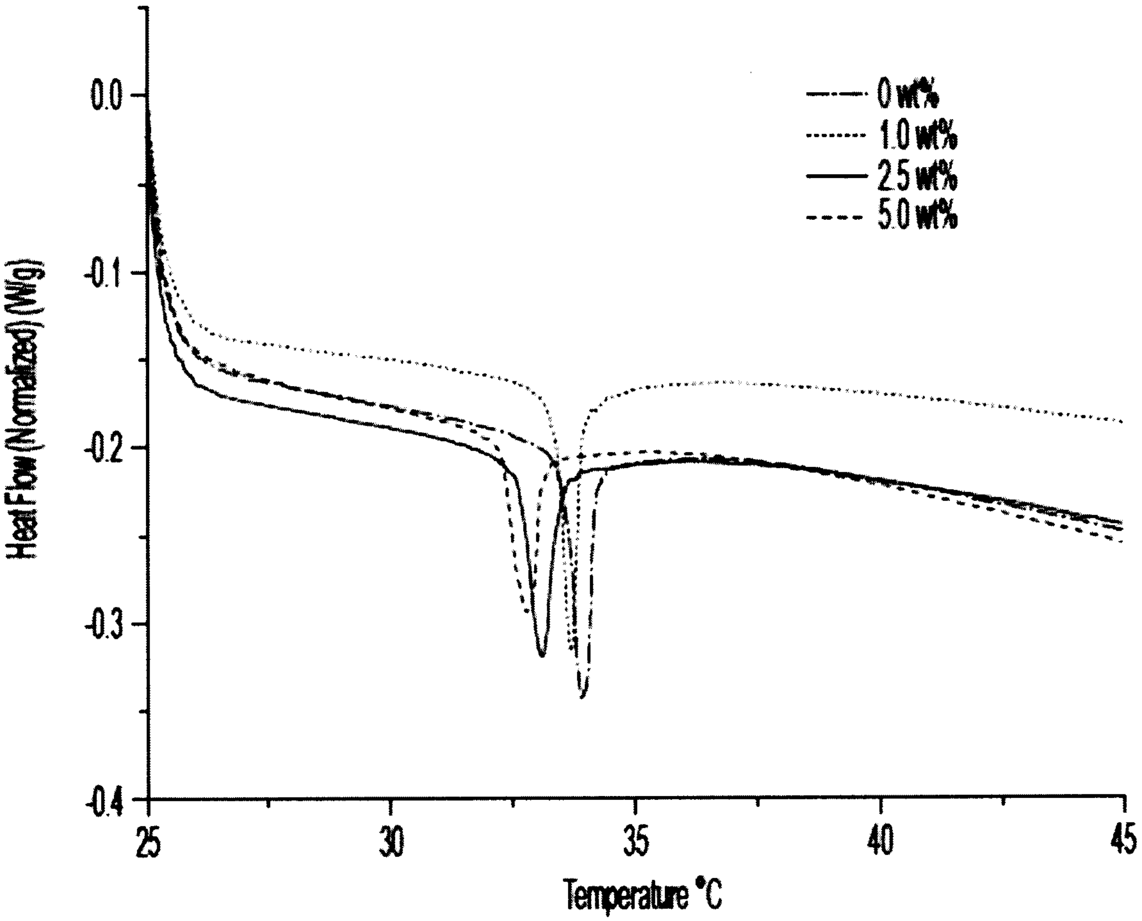
FIG. 20 shows DSC thermograms showing the nematic to isotropic phase transition of electrospun fibers containing 0-5 wt % of $C_4AzoC_6OAc$ in CB5 as the core.

Electrospinning resulted in the formation of fibrous mats which were analyzed by DSC to examine the effect of the concentration of $C_4AzoC_6OAc$ on the $T_{N \rightarrow I}$ of CB5 (FIG. 20). Neat CB5 shows a sharp, endothermic transition at 34° C. corresponding to the nematic to isotropic phase transition. It has been well established that encapsulation of liquid crystals within nanofibers leads to a decrease in the $T_{N \rightarrow I}$ when compared to bulk systems. Incorporation of $C_4AzoC_6OAc$ into the LC core results in further decrease of the $T_{N \rightarrow I}$ and a broadening of the peak with increasing concentration of $C_4AzoC_6OAc$. These observations suggest a disruption global ordering in the LC core with the addition of $C_4AzoC_6OAc$. Before irradiation, it exists primarily in its trans state. It has been previously observed that the addition of azobenzene derivatives into LC host materials can significantly affect the phase transitions of nematic liquid crystals by affecting the ordering of the host mixture (Sun et al., "Dynamics of Photochemical Phase Transition of Guest/Host Liquid Crystals with an Azobenzene Derivative as a Photoresponsive Chromophore" *Chem. Mater.* 2002, 14, 7; Garcia-Amoros et al., "Nematic-to-isotropic photo-induced phase transition in azobenzene-doped low-molar liquid crystals" *Phys. Chem. Chem. Phys.* 2009, 11 (21), 4244-50).

Incorporation of $C_4AzoC_6OAc$ into the LC allows for the photoinduced phase transition of CB5 within the nanofibers (FIG. 3). This demonstration of the control over the phase behavior of a LC encapsulated within nanofibers by light. As shown in FIG. 3, when fibers manufactured with 5.0 wt. % of compound $C_4AzoC_6OAc$ within CB5 are in the core, irradiation with 365 nm light causes the loss of birefringence indicating the LC has transitioned form its nematic to isotropic phase. After irradiation, when kept dark, the birefringence of the sample did not return after at least 8 hours. However, when after UV irradiation the sample was exposed to visible light at 400-500 nm, the birefringence completely recovered. The birefringence of fibers formed with 0 wt. % of $C_4AzoC_6OAc$ in PVP was unchanging with irradiation at 365 or 400-500 nm (FIG. 19).

Figure 21:
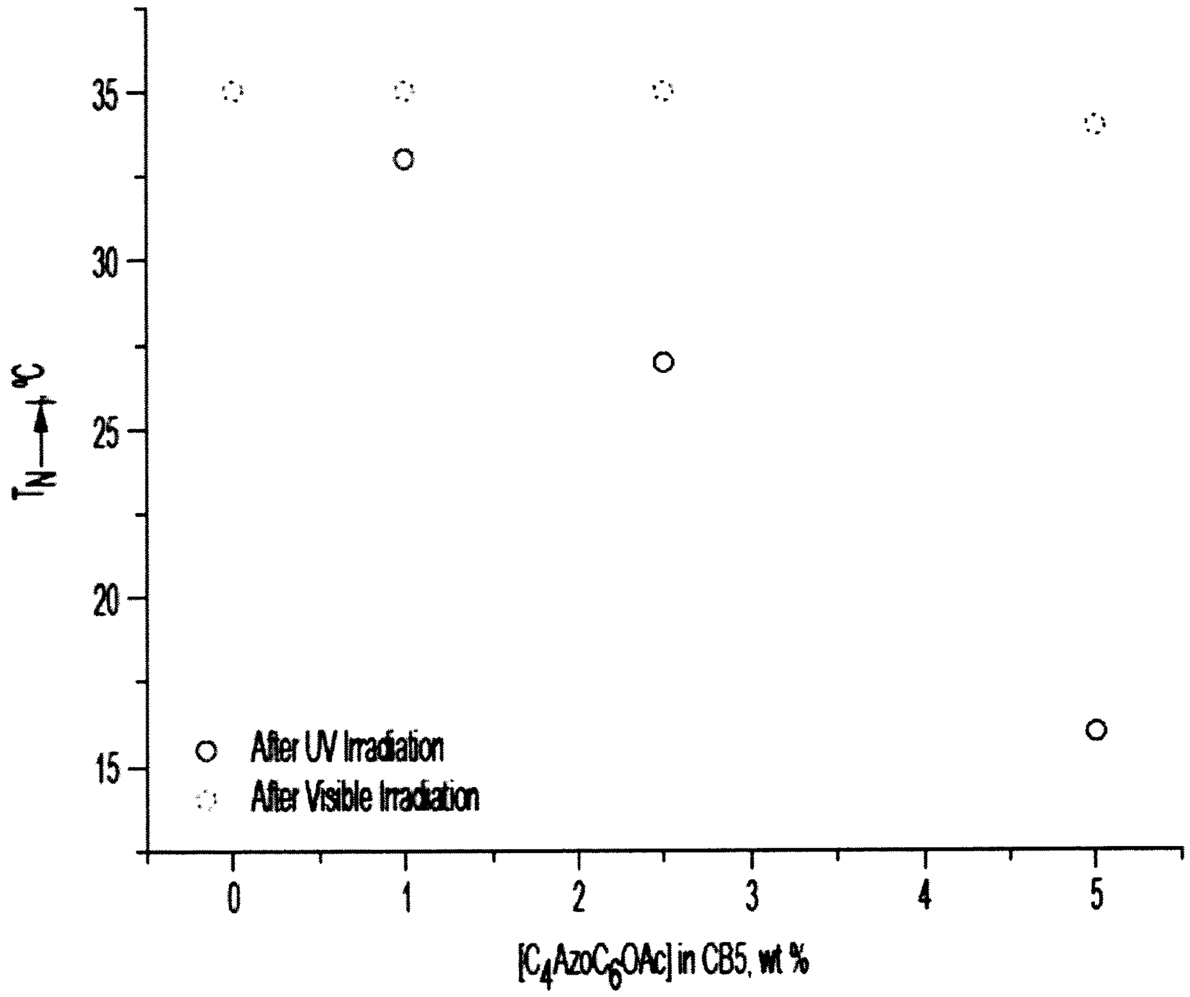
FIG. 21 shows the relationship between the concentration of $C_4AzoC_4OAc$ in CB5 and the $T_{N \to I}$ with UV and visible irradiation.

There was no loss of birefringence of fibers formed with 1.0 wt. % of compound 3 after irradiation with 365 nm light at 25° C. (FIG. 4). Even after irradiation times of greater than 10 minutes, no change was observed in the phase behavior of the LC core. At elevated temperatures, however, where the LC is still in its nematic phase, UV irradiation for 5 seconds results in the phase transition of the LC core from its nematic to isotropic phase (FIGS. 4, D-E). Likewise, at 33° C., irradiation with visible light causes the LC to transition back to its nematic phase demonstrating the reversibility of the system. The same trend can be seen for the 2.5 wt. % mixture which only clears completely at 29° C. after UV irradiation. Interestingly, for LCs with 5.0 wt. % of $C_4AzoC_6OAc$, UV irradiation of the fibers triggers the phase transition as low as 15° C. Although photoinduced phase transition was still operative at temperatures as low as 10° C., below 15° C. the fibers burst and were not reformed after heating. A summary of the effects irradiation, and the concentration of $C_4AzoC_6OAc$, on the $T_{N \rightarrow I}$ of encapsulated CR5 are shown in Table 1 and FIG. 21. For all fibers, the thermally induced phase transition comes at or near 35° C., but fibers containing $C_4AzoC_6OAC$ in the LC core are seen to transition at a lower temperature after UV irradiation owing to a disruption of the global ordering of the LC mixture by the cis isomer of $C_4AzoC_6OAc$. The trans isomer also seems to slightly disrupt the ordering, as can be seen in the DSC results, however these changes are slight and do not significantly affect the transition temperature.

TABLE 1

$T_{N \rightarrow I}$ of azo-doped CB5 in PVP fibers

| [$C_4AzoC_6OAc$] (wt. %) | $T_{N \rightarrow I}$ (° C.) | $T_{N \rightarrow I}$ after UV[a] irradiation[d] (° C.) | $T_{N \rightarrow I}$ after Vis[b] irradiation[d] (° C.) |
|---|---|---|---|
| 0 | 34.0[c], 36.0[d] | 35.4 | 35.1 |
| 1.0 | 33.7[c], 35.4[d] | 33.7 | 35.2 |
| 2.5 | 33.1[c], 35.2[d] | 27.2 | 35.1 |
| 5.0 | 32.7[c], 35.1[d] | 15.5 | 34.1 |

[a]365 nm for 10 seconds.
[b]400-500 nm for 10 seconds.
[c]Measured by DSC.
[d]Measured by loss of birefringence by POM.

Photochemical control over the phase transitions of CB5 encapsulated within microscale PVP fibers was demonstrated. An azobenzene derivate was synthesized and used as the dopant to a host CB5 nematic liquid crystal. Coaxial electrospinning resulted in uniform to slightly beaded fibers which were analyzed by DSC and POM. When fibers fabricated with azo-doped CB5 were analyzed by DSC, a slight decrease in the temperature for the endothermic peak corresponding to the nematic to isotropic phase transition was observed. The same result was overserved when the clearing point was measured by POM. After UV irradiation, however, the $T_{N \rightarrow I}$ was dramatically reduced for LC mixtures containing 5 wt. % of azo-dye, $C_4AzoC_6OAc$ with the clearing point being observed as low at 15° C. For mixtures containing less $C_4AzoC_6OAc$, the $T_{N \rightarrow I}$ was still overserved to be less than that of neat CB5, however, complete loss of birefringence required heating in addition to UV irradiation. In all cases, the photoinduced phase transition was reversible, with visible, blue light, irradiation favoring the formation of the nematic state.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A fiber comprising:
a sheath comprising a polymer; and
a core comprising:
a liquid crystal; and
a compound capable of photoisomerization;
wherein the core is in liquid form.

2. The fiber of claim 1, wherein the polymer is polyvinylpyrrolidone.

3. The fiber of claim 1, wherein the liquid crystal is 4-cyano-4'-n-pentylbiphenyl.

4. The fiber of claim 1, wherein the compound capable of photoisomerization is an azobenzene.

5. The fiber of claim 1, wherein the compound capable of photoisomerization is

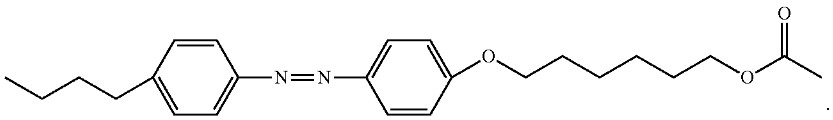 [SMILES: CCCCc1ccc(N=Nc2ccc(OCCCCCCOC(C)=O)cc2)cc1]

6. The fiber of claim 1, wherein the fiber has a diameter of no more than 5 microns.

7. An article comprising one or more of the fibers of claim 1.

8. The article of claim 7, wherein the article is in the form of a sheet comprising at least 50 wt. % of the fibers.

9. A method comprising:
exposing the article of claim 7 to first electromagnetic radiation that causes a first photoisomerization of the compound and disruption of a nematic phase of the liquid crystal.

10. The method of claim 9, wherein only a portion of the surface of the article is exposed to the first electromagnetic radiation.

11. The method of claim 9, further comprising:
exposing the article to second electromagnetic radiation that causes a second photoisomerization of the compound and restoration of the nematic phase of the liquid crystal.

12. The method of claim 11, wherein only a portion of the surface of the article is exposed to the second electromagnetic radiation.

13. A method comprising:
providing a first solution comprising a polymer;
providing a second solution comprising a liquid crystal and compound capable of photoisomerization; and
electrospinning the first solution and the second solution to form a fiber comprising:
a sheath comprising the polymer; and
a core comprising:
the liquid crystal; and
the compound;
wherein the core is in liquid form.

14. The method of claim 13, wherein the polymer is polyvinylpyrrolidone.

15. The method of claim 13, wherein the liquid crystal is 4-cyano-4'-n-pentylbiphenyl.

16. The method of claim 13, wherein the compound capable of photoisomerization is an azobenzene.

17. The method of claim 13, wherein the compound capable of photoisomerization is

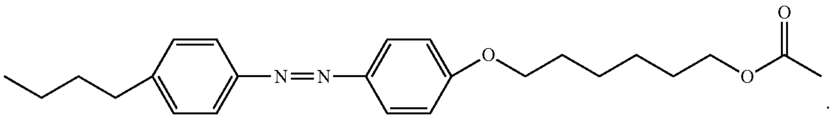 [SMILES: CCCCc1ccc(N=Nc2ccc(OCCCCCCOC(C)=O)cc2)cc1]
18. A compound having the formula:
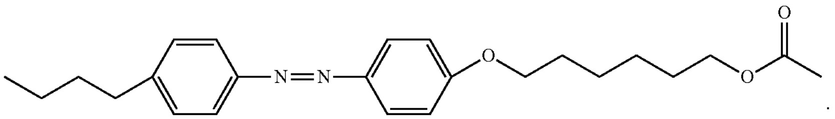 [SMILES: CCCCc1ccc(N=Nc2ccc(OCCCCCCOC(C)=O)cc2)cc1]
* * * * *